United States Patent
Xiong et al.

(10) Patent No.: US 10,958,843 B2
(45) Date of Patent: Mar. 23, 2021

(54) MULTI-CAMERA SYSTEM FOR SIMULTANEOUS REGISTRATION AND ZOOMED IMAGERY

(71) Applicant: United Technologies Corporation, Farmington, CT (US)

(72) Inventors: Ziyou Xiong, Wethersfield, CT (US); Alan Matthew Finn, Hebron, CT (US); Richard W. Osborne, III, Stafford Springs, CT (US); Jose Miguel Pasini, Avon, CT (US); Edgar A. Bernal, Webster, NY (US); Ozgur Erdinc, Mansfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 15/971,214

(22) Filed: May 4, 2018

(65) Prior Publication Data
US 2019/0342499 A1    Nov. 7, 2019

(51) Int. Cl.
*H04N 5/232*    (2006.01)
*H04N 5/247*    (2006.01)
(Continued)

(52) U.S. Cl.
CPC ....... *H04N 5/23296* (2013.01); *G01B 11/005* (2013.01); *G01N 21/8851* (2013.01);
(Continued)

(58) Field of Classification Search
CPC ............ G01B 11/2513; G01B 11/2545; G01B 11/005; G06T 7/0004; G06T 7/0008;
(Continued)

(56) References Cited

U.S. PATENT DOCUMENTS

| 3,804,397 | A | 4/1974 | Neumann |
| 4,402,053 | A | 8/1983 | Kelley et al. |

(Continued)

FOREIGN PATENT DOCUMENTS

| CA | 2820732 A1 | 12/2014 |
| DE | 19710743 A1 | 9/1998 |

(Continued)

OTHER PUBLICATIONS

Blachnio et al, "Assessment of Technical Condition Demonstrated by Gas Turbine Blades by Processing of Images of Their Surfaces", Journal of KONBiN, 1(21), 2012, pp. 41-50.
(Continued)

*Primary Examiner* — Nathnael Aynalem
(74) *Attorney, Agent, or Firm* — Bachman & LaPointe, P.C.

(57) ABSTRACT

A multi-camera system for a component inspection comprising a table having a table top or, alternatively, another sufficiently rigid surface; a first camera having a narrow field-of-view lens; a second camera having a wide field-of-view lens linked to said first camera, wherein said first camera and said second camera are configured to move identical distances along a common axis relative to said table top or surface; and a pre-defined pattern defined on said table top or surface.

15 Claims, 4 Drawing Sheets

(51) Int. Cl.
    *H04N 17/00*     (2006.01)
    *G01B 11/00*     (2006.01)
    *G01N 21/88*     (2006.01)
    *G02B 21/36*     (2006.01)

(52) U.S. Cl.
    CPC ........... *H04N 5/247* (2013.01); *H04N 17/002* (2013.01); *G01N 2021/8887* (2013.01); *G02B 21/365* (2013.01)

(58) Field of Classification Search
    CPC ..... G06T 7/593; G06T 7/0002; H04N 13/243; H04N 5/23296; H04N 17/002; H04N 5/247; H04N 21/8851; G01N 21/8851; G01N 2021/8887; G02B 21/365; G02B 21/361; H01J 2237/2817; H05K 1/0269; Y10S 252/96
    USPC ................................................ 348/47, 48, 87
    See application file for complete search history.

(56) References Cited

U.S. PATENT DOCUMENTS

| | | | |
|---|---|---|---|
| 4,403,294 A | 9/1983 | Hamada et al. | |
| 4,873,651 A | 10/1989 | Raviv | |
| 5,064,291 A | 11/1991 | Reiser | |
| 5,119,678 A | 6/1992 | Bashyam et al. | |
| 5,345,514 A | 9/1994 | Mandavieh et al. | |
| 5,345,515 A | 9/1994 | Nishi et al. | |
| 5,351,078 A | 9/1994 | Lemelson | |
| 5,963,328 A | 10/1999 | Yoshida et al. | |
| 6,023,637 A | 2/2000 | Liu et al. | |
| 6,153,889 A | 11/2000 | Jones | |
| 6,177,682 B1 | 1/2001 | Bartulovic et al. | |
| 6,271,520 B1 | 8/2001 | Tao et al. | |
| 6,399,948 B1 | 6/2002 | Thomas | |
| 6,434,267 B1 | 8/2002 | Smith | |
| 6,462,813 B1 | 10/2002 | Haven et al. | |
| 6,690,016 B1 | 2/2004 | Watkins et al. | |
| 6,737,648 B2 | 5/2004 | Fedder et al. | |
| 6,759,659 B2 | 7/2004 | Thomas et al. | |
| 6,804,622 B2 | 10/2004 | Bunker et al. | |
| 6,907,358 B2 | 6/2005 | Suh et al. | |
| 6,965,120 B1 | 11/2005 | Beyerer et al. | |
| 7,026,811 B2 | 4/2006 | Roney, Jr. et al. | |
| 7,064,330 B2 | 6/2006 | Raulerson et al. | |
| 7,119,338 B2 | 10/2006 | Thompson et al. | |
| 7,122,801 B2 | 10/2006 | Favro et al. | |
| 7,129,492 B2 | 10/2006 | Saito et al. | |
| 7,164,146 B2 | 1/2007 | Weir et al. | |
| 7,190,162 B2 | 3/2007 | Tenley et al. | |
| 7,220,966 B2 | 5/2007 | Saito et al. | |
| 7,233,867 B2 | 6/2007 | Pisupati et al. | |
| 7,240,556 B2 | 7/2007 | Georgeson et al. | |
| 7,272,529 B2 | 9/2007 | Hogan et al. | |
| 7,313,961 B2 | 1/2008 | Tenley et al. | |
| 7,415,882 B2 | 8/2008 | Fetzer et al. | |
| 7,446,886 B2 | 11/2008 | Aufmuth et al. | |
| 7,489,811 B2 | 2/2009 | Brummel et al. | |
| 7,602,963 B2 | 10/2009 | Nightingale et al. | |
| 7,689,030 B2 | 3/2010 | Suh et al. | |
| 7,724,925 B2 | 5/2010 | Shepard | |
| 7,738,725 B2 | 6/2010 | Raskar et al. | |
| 7,823,451 B2 | 11/2010 | Sarr | |
| 7,966,883 B2 | 6/2011 | Lorraine et al. | |
| 8,050,491 B2 * | 11/2011 | Vaidyanathan | G06T 17/10 |
| | | | 345/419 |
| 8,204,294 B2 | 6/2012 | Alloo et al. | |
| 8,208,711 B2 | 6/2012 | Venkatachalam et al. | |
| 8,221,825 B2 | 7/2012 | Reitz et al. | |
| 8,239,424 B2 | 8/2012 | Haigh et al. | |
| 8,431,917 B2 | 4/2013 | Wang et al. | |
| 8,449,176 B2 | 5/2013 | Shepard | |
| 8,520,931 B2 | 8/2013 | Tateno | |
| 8,528,317 B2 | 9/2013 | Gerez et al. | |
| 8,692,887 B2 | 4/2014 | Ringermacher et al. | |
| 8,744,166 B2 | 6/2014 | Scheid et al. | |
| 8,761,490 B2 | 6/2014 | Scheid et al. | |
| 8,781,209 B2 | 7/2014 | Scheid et al. | |
| 8,781,210 B2 | 7/2014 | Scheid et al. | |
| 8,792,705 B2 | 7/2014 | Scheid et al. | |
| 8,913,825 B2 | 12/2014 | Taguchi et al. | |
| 8,983,794 B1 | 3/2015 | Motzer et al. | |
| 9,037,381 B2 | 5/2015 | Care | |
| 9,046,497 B2 | 6/2015 | Kush et al. | |
| 9,066,028 B1 | 6/2015 | Koshti | |
| 9,080,453 B2 | 7/2015 | Shepard et al. | |
| 9,116,071 B2 | 8/2015 | Hatcher, Jr. et al. | |
| 9,134,280 B2 | 9/2015 | Cataldo et al. | |
| 9,146,205 B2 | 9/2015 | Renshaw et al. | |
| 9,151,698 B2 | 10/2015 | Jahnke et al. | |
| 9,154,743 B2 | 10/2015 | Hatcher, Jr. et al. | |
| 9,240,049 B2 | 1/2016 | Ciurea et al. | |
| 9,251,582 B2 | 2/2016 | Lim et al. | |
| 9,300,865 B2 | 3/2016 | Wang et al. | |
| 9,305,345 B2 | 4/2016 | Lim et al. | |
| 9,458,735 B1 | 10/2016 | Diwinsky et al. | |
| 9,465,385 B2 | 10/2016 | Kamioka et al. | |
| 9,467,628 B2 | 10/2016 | Geng et al. | |
| 9,471,057 B2 | 10/2016 | Scheid et al. | |
| 9,476,798 B2 | 10/2016 | Pandey et al. | |
| 9,476,842 B2 | 10/2016 | Drescher et al. | |
| 9,483,820 B2 | 11/2016 | Lim et al. | |
| 9,488,592 B1 | 11/2016 | Maresca et al. | |
| 9,519,844 B1 | 12/2016 | Thompson et al. | |
| 9,594,059 B1 | 3/2017 | Brady et al. | |
| 9,734,568 B2 | 5/2017 | Vajaria et al. | |
| 9,785,919 B2 | 10/2017 | Diwinsky et al. | |
| 9,804,997 B2 | 10/2017 | Sharp et al. | |
| 9,808,933 B2 | 11/2017 | Lin et al. | |
| 9,981,382 B1 | 5/2018 | Strauss et al. | |
| 10,438,036 B1 * | 10/2019 | Reome | G06K 7/1491 |
| 2002/0121602 A1 | 9/2002 | Thomas et al. | |
| 2002/0167660 A1 | 11/2002 | Zaslaysky | |
| 2003/0117395 A1 * | 6/2003 | Yoon | G03B 35/20 |
| | | | 345/419 |
| 2003/0205671 A1 | 11/2003 | Thomas et al. | |
| 2004/0089811 A1 | 5/2004 | Lewis et al. | |
| 2004/0089812 A1 | 5/2004 | Favro et al. | |
| 2004/0139805 A1 | 7/2004 | Antonelli et al. | |
| 2004/0201672 A1 * | 10/2004 | Varadarajan | H04N 7/183 |
| | | | 348/148 |
| 2004/0240600 A1 | 12/2004 | Freyer et al. | |
| 2004/0245469 A1 | 12/2004 | Favro et al. | |
| 2004/0247170 A1 | 12/2004 | Furze et al. | |
| 2005/0008215 A1 | 1/2005 | Shepard | |
| 2005/0113060 A1 | 5/2005 | Lowery | |
| 2005/0151083 A1 | 7/2005 | Favro et al. | |
| 2005/0167596 A1 | 8/2005 | Rothenfusser et al. | |
| 2005/0276907 A1 | 12/2005 | Arris et al. | |
| 2006/0012790 A1 | 1/2006 | Furze et al. | |
| 2006/0078193 A1 | 4/2006 | Brummel et al. | |
| 2006/0086912 A1 | 4/2006 | Weir et al. | |
| 2007/0007733 A1 | 1/2007 | Hogarth et al. | |
| 2007/0017297 A1 | 1/2007 | Georgeson et al. | |
| 2007/0045544 A1 | 3/2007 | Favro et al. | |
| 2008/0022775 A1 | 1/2008 | Sathish et al. | |
| 2008/0053234 A1 | 3/2008 | Staroselsky et al. | |
| 2008/0111074 A1 | 5/2008 | Weir et al. | |
| 2008/0183402 A1 | 7/2008 | Malkin et al. | |
| 2008/0229834 A1 | 9/2008 | Bossi et al. | |
| 2008/0247635 A1 | 10/2008 | Davis et al. | |
| 2008/0247636 A1 | 10/2008 | Davis et al. | |
| 2009/0000382 A1 | 1/2009 | Sathish et al. | |
| 2009/0010507 A1 | 1/2009 | Geng | |
| 2009/0066939 A1 | 3/2009 | Venkatachalam et al. | |
| 2009/0128643 A1 * | 5/2009 | Kondo | H04N 5/3415 |
| | | | 348/218.1 |
| 2009/0252987 A1 | 10/2009 | Greene, Jr. | |
| 2009/0279772 A1 | 11/2009 | Sun et al. | |
| 2009/0312956 A1 | 12/2009 | Zombo et al. | |
| 2010/0212430 A1 | 8/2010 | Murai et al. | |
| 2010/0220910 A1 | 9/2010 | Kaucic et al. | |
| 2011/0062339 A1 | 3/2011 | Ruhge et al. | |

(56) References Cited

U.S. PATENT DOCUMENTS

| | | | |
|---|---|---|---|
| 2011/0083705 A1 | 4/2011 | Stone et al. | |
| 2011/0119020 A1 | 5/2011 | Key | |
| 2011/0123093 A1 | 5/2011 | Alloo et al. | |
| 2011/0299752 A1 | 12/2011 | Sun | |
| 2011/0302694 A1 | 12/2011 | Wang et al. | |
| 2012/0154599 A1* | 6/2012 | Huang | H04N 5/232 348/169 |
| 2012/0188380 A1 | 7/2012 | Drescher et al. | |
| 2012/0249959 A1 | 10/2012 | You et al. | |
| 2012/0275667 A1* | 11/2012 | Lu | H04N 13/239 382/118 |
| 2012/0293647 A1 | 11/2012 | Singh et al. | |
| 2013/0028478 A1 | 1/2013 | St-Pierre et al. | |
| 2013/0041614 A1 | 2/2013 | Shepard et al. | |
| 2013/0070897 A1 | 3/2013 | Jacotin | |
| 2013/0113914 A1 | 5/2013 | Scheid et al. | |
| 2013/0113916 A1 | 5/2013 | Scheid et al. | |
| 2013/0163849 A1 | 6/2013 | Jahnke et al. | |
| 2013/0235897 A1 | 9/2013 | Bouteyre et al. | |
| 2013/0250067 A1* | 9/2013 | Laxhuber | H04N 13/239 348/47 |
| 2014/0022357 A1* | 1/2014 | Yu | G01B 11/25 348/48 |
| 2014/0056507 A1 | 2/2014 | Doyle et al. | |
| 2014/0098836 A1 | 4/2014 | Bird | |
| 2014/0184786 A1 | 7/2014 | Georgeson et al. | |
| 2014/0185912 A1 | 7/2014 | Lim et al. | |
| 2014/0198185 A1* | 7/2014 | Haugen | G06T 7/0008 348/48 |
| 2014/0200832 A1 | 7/2014 | Troy et al. | |
| 2014/0350338 A1 | 11/2014 | Tanaka et al. | |
| 2015/0041654 A1 | 2/2015 | Barychev et al. | |
| 2015/0046098 A1 | 2/2015 | Jack et al. | |
| 2015/0086083 A1 | 3/2015 | Chaudhry et al. | |
| 2015/0128709 A1 | 5/2015 | Stewart et al. | |
| 2015/0138342 A1 | 5/2015 | Brdar et al. | |
| 2015/0185128 A1 | 7/2015 | Chang et al. | |
| 2015/0233714 A1 | 8/2015 | Kim | |
| 2015/0253266 A1 | 9/2015 | Lucon et al. | |
| 2015/0314901 A1 | 11/2015 | Murray et al. | |
| 2016/0012588 A1* | 1/2016 | Taguchi | H04N 17/002 348/46 |
| 2016/0043008 A1 | 2/2016 | Murray et al. | |
| 2016/0109283 A1 | 4/2016 | Broussais-Colella et al. | |
| 2016/0178532 A1 | 6/2016 | Lim et al. | |
| 2016/0241793 A1* | 8/2016 | Ravirala | H04N 5/247 |
| 2016/0284098 A1 | 9/2016 | Okumura et al. | |
| 2016/0314571 A1 | 10/2016 | Finn et al. | |
| 2016/0328835 A1 | 11/2016 | Maresca, Jr. et al. | |
| 2016/0334284 A1 | 11/2016 | Kaplun Mucharrafille et al. | |
| 2017/0011503 A1 | 1/2017 | Newman | |
| 2017/0023505 A1 | 1/2017 | Maione et al. | |
| 2017/0052152 A1 | 2/2017 | Tat et al. | |
| 2017/0085760 A1 | 3/2017 | Ernst et al. | |
| 2017/0090458 A1 | 3/2017 | Lim et al. | |
| 2017/0122123 A1 | 5/2017 | Kell et al. | |
| 2017/0142302 A1 | 5/2017 | Shaw et al. | |
| 2017/0184469 A1 | 6/2017 | Chang et al. | |
| 2017/0184549 A1 | 6/2017 | Reed et al. | |
| 2017/0184650 A1 | 6/2017 | Chang et al. | |
| 2017/0211408 A1 | 7/2017 | Ahmadian et al. | |
| 2017/0219815 A1 | 8/2017 | Letter et al. | |
| 2017/0221274 A1 | 8/2017 | Chen et al. | |
| 2017/0234837 A1 | 8/2017 | Hall et al. | |
| 2017/0241286 A1 | 8/2017 | Roberts et al. | |
| 2017/0258391 A1 | 9/2017 | Finn et al. | |
| 2017/0262965 A1 | 9/2017 | Xiong et al. | |
| 2017/0262977 A1 | 9/2017 | Finn et al. | |
| 2017/0262979 A1 | 9/2017 | Xiong et al. | |
| 2017/0262985 A1 | 9/2017 | Finn et al. | |
| 2017/0262986 A1 | 9/2017 | Xiong et al. | |
| 2017/0270651 A1 | 9/2017 | Bailey et al. | |
| 2017/0297095 A1 | 10/2017 | Zalameda et al. | |
| 2017/0284971 A1 | 11/2017 | Hall | |
| 2018/0002039 A1 | 1/2018 | Finn et al. | |
| 2018/0005362 A1 | 1/2018 | Wang et al. | |
| 2018/0013959 A1 | 1/2018 | Slavens et al. | |
| 2018/0019097 A1 | 1/2018 | Harada et al. | |
| 2018/0098000 A1* | 4/2018 | Park | H04N 5/23241 |
| 2018/0111239 A1 | 4/2018 | Zak et al. | |
| 2019/0299542 A1 | 10/2019 | Webb | |

FOREIGN PATENT DOCUMENTS

| | | | |
|---|---|---|---|
| EP | 1961919 A2 | 8/2008 | |
| GB | 2545271 A | 6/2017 | |
| JP | 06235700 A | 8/1994 | |
| JP | 2015161247 A | 9/2015 | |
| SG | 191452 A1 | 7/2013 | |
| WO | WO-2013088709 A1 * | 6/2013 | G02B 23/2423 |
| WO | 2016112018 A1 | 7/2016 | |
| WO | 2016123508 A1 | 8/2016 | |
| WO | 2016176524 A1 | 11/2016 | |

OTHER PUBLICATIONS

Raskar et al., 'A Non-photorealistic Camera: Depth Edge Detection and Stylized Rendering using Multi-flash Imaging' ACM Transactions on Graphics, 2004 http://www.merl.com/publications/docs/TR2006-107.pdf.

Feris et al., 'Specular Reflection Reduction with Multi-Flash Imaging', 17th Brazilian Symposium on Computer Graphics and Image Processing, 2004. http://rogerioferis.com/publications/FerisSIB04.pdf.

Holland, "First Measurements from a New Broadband Vibrothermography Measurement System", AIP Conference Proceedings, 894 (2007), pp. 478-483. http://link.aip.org/link/doi/10.1063/1.2718010\.

Gao et al., 'Detecting Cracks in Aircraft Engine Fan Blades Using Vibrothermography Nondestructive Evaluation', RESS Special Issue on Accelerated Testing, 2014, http://dx.doi.org/10.1016/j.ress.2014.05.009.

Gao et al., 'A Statistical Method for Crack Detection from Vibrothermography Inspection Data', Statistics Preprints. Paper 68. http://lib.dr.iastate.edu/stat_las_preprints/68.

Holland, 'Thermographic Signal Reconstruction for Vibrothermography', Infrared Physics & Technology 54 (2011) 503-511.

Li et al., 'Statistical Methods for Automatic Crack Detection Based on Vibrothermography Sequence-of-Images Data', Statistics Preprints. Paper 69. http://lib.dr.iastate.edu/stat_las_preprints/69.

Tian et al., 'A Statistical Framework for Improved Automatic Flaw Detection in Nondestructive Evaluation Images', Technometrics, 59, 247-261.

Henneke et al. 'Detection of Damage in Composite Materials by Vibrothermography', ASTM special technical publication (696), 1979, pp. 83-95.

http://www.npl.co.uk/commercial-services/sector-case-studies/thermal-imaging-reveals-the-invisible.

Gao et al., 'A Statistical Method for Crack Detection from Vibrothermography Inspection Data',(2010) Statistics Preprints. Paper 68. http://lib.dr.iastate.edu/stat_las_preprints/68.

Li1 Ming; Holland1 Stephen D.; and Meeker1 William Q.1 "Statistical Methods for Automatic Crack Detection Based on Vibrothermography Sequence-of-Images Data" (2010). Statistics Preprints. 69.

Henneke et al. 'Detection of Damage in Composite Materials by Vibrothermography', ASTM special technical publication (696), American Society for Testing and Materials, 1979, pp. 83-95.

http://www.npl.co.uk/commercial-services/sector-case-studies/thermal-imaging-reveals-the-invisible; Apr. 17, 2012.

Tian et al., 'A Statistical Framework for Improved Automatic Flaw Detection in Nondestructive Evaluation Images', Technometrics, 59, 247-261. Feb. 1, 2017.

Emmanuel J. Cand'es1,2, Xiaodong LI2, Yi MA3,4, and John Wright4, "Robust Principal Component Analysis", (1)Department of Statistics, Stanford University, Stanford, CA; (2)Department of

(56) References Cited

OTHER PUBLICATIONS

Mathematics, Stanford University, Stanford, CA; (3, 4) Electrical and Computer Engineering, UIUC, Urbana, IL (4) Microsoft Research Asia, Beijing, China, Dec. 17, 2009.
Sebastien Parent; "From Human to Machine: How to Be Prepared for Integration of Automated Visual Inspection" Quality Magazine, https://www.qualitymag.com/articles/91976. Jul. 2, 2014.
http://www.yxlon.com/products/x-ray-and-ct-inspection-systems/yxlon-mu56-tb, 2016.
E J. Candès, X. Li, Y. Ma, and J. Wright, "Robust Principal Component Analysis", submitted. http://www-stat.stanford.edu/~candes/papers/RobustPCA.pdf.
M. Sznaier, O. Camps, N. Ozay, T. Ding, G. Tadmor and D. Brooks, "The Role of Dynamics in Extracting Information Sparsely Encoded in High Dimensional Data Streams", in Dynamics of Information Systems, Hirsch, M.J.; Pardalos, P. M.; Murphey, R. (Eds.), pp. 1-28, Springer Verlag, 2010.
M. Fazel, H. Hindi, and S. Boyd, "A Rank Minimization Heuristic with Application to Minimum Order System Approximation", American Control Conference, Arlington, Virginia, pp. 4734-4739, Jun. 2001.
Meola et al., 'An Excursus on Infrared Thermography Imaging', J. Imaging 2016, 2, 36 http://www.mdpi.com/2313-433X/2/4/36/pdf.
Yu et al., 'ASIFT: An Algorithm for Fully Affine Invariant Comparison', Image Processing on Line on Feb. 24, 2011. http://www.ipol.im/pub/art/2011/my-asift/article.pdf.
Schemmel et al., 'Measurement of Direct Strain Optic Coefficient of Ysz Thermal Barrier Coatings at Ghz Frequencies', Optics Express, v. 25, n. 17, Aug. 21, 2017, https://doi.org/10.1364/OE.25.019968.
Jean-Yves Bouguet, "Camera Calibration Toolbox for Matlab", http://www.vision.caltech.edu/bouguetj/calib_doc/, accessed on Nov. 10, 2017.
https://www.qualitymag.com/articles/91976-from-human-to-machine-how-to-be-prepared-for-integration-of-automated-visual-inspection.
http://www.yxlon.com/products/x-ray-and-ct-inspection-systems/yxlon-mu56-tb.
Yu et al. 'Shadow Graphs and 3D Texture Reconstruction', IJCV, vol. 62, No. 1-2, 2005, pp. 35-60.
U.S. Non-Final Office Action dated Nov. 29, 2019 for corresponding U.S. Appl. No. 15/971,242.
U.S. Non-Final Office Action dated Nov. 26, 2019 for corresponding U.S. Appl. No. 15/971,194.
U.S. Non-Final Office Action dated Apr. 30, 2020 issued for corresponding U.S. Appl. No. 15/970,944.
U.S. Non-Final Office Action dated Mar. 12, 2020 for corresponding U.S. Appl. No. 15/971,194.
U.S. Final Office Action dated Aug. 27, 2020 issued for corresponding U.S. Appl. No. 15/970,944.
U.S. Non-Final Office Action dated May 21, 2020 issued for corresponding U.S. Appl. No. 15/971,236.
U.S. Non-Final Office Action dated Aug. 28, 2020 issued for corresponding U.S. Appl. No. 15/971,194.
U.S. Non-Final Office Action dated Jun. 23, 2020 issued for corresponding U.S. Appl. No. 15/971,205.
U.S. Notice of Allowance dated Oct. 19, 2020 issued for corresponding U.S. Appl. No. 15/971,270.
U.S. Non-Final Office Action dated Mar. 5, 2019 for corresponding U.S. Appl. No. 15/971,227.

\* cited by examiner

MULTI-CAMERA SYSTEM FOR SIMULTANEOUS REGISTRATION AND ZOOMED IMAGERY

BACKGROUND

The present disclosure is directed to an automated optical inspection system for components using simultaneous multiple camera images to create a zoom factor for a narrow field of view camera. Particularly, the disclosure is directed to obtaining an accurate lens zoom factor for the narrow field of view camera by coupling another camera having a wider field of view to move simultaneously with the narrow field of view camera.

Gas turbine engine components, such as blades, vanes, disks, gears, and the like, may suffer irregularities during manufacture or wear and damage during operation, for example, due to erosion, hot corrosion (sulfidation), cracks, dents, nicks, gouges, and other damage, such as from foreign object damage. Detecting this damage may be achieved by images or videos for aircraft engine blade inspection, power turbine blade inspection, internal inspection of mechanical devices, and the like. A variety of techniques for inspecting by use of images or videos may include capturing and displaying images or videos to human inspectors for manual defect detection and interpretation. Human inspectors may then decide whether any defect exists within those images or videos. When human inspectors look at many similar images of very similar blades of an engine stage or like components of any device, they may not detect defects, for example, because of fatigue or distraction experienced by the inspector. Missing a defect may lead to customer dissatisfaction, transportation of an expensive engine back to service centers, lost revenue, or even engine failure. The damaged blades are currently inspected manually by visual inspection, see FIG. 1, or by non-destructive evaluation (NDE) techniques such as eddy current, ultrasound, or fluorescent penetrant inspection. The state of the art manual inspections can be tedious, time consuming, imprecise, and error prone. To perform such inspection by automated techniques, high magnification (zoom) is sometimes required to obtain sufficient, unambiguous, data to achieve reliable results. When high magnification is used in an optical system, the field-of-view is correspondingly reduced. The reduced field-of-view may be so small that structural details, typically used to compute size (which is critical to understand damage severity), may no longer be visible. What is needed is a way to compute a zoom factor that is not based on structural details of the component being inspected.

SUMMARY

In accordance with the present disclosure, there is provided a multi-camera system for component inspection comprising a rigid surface; a first camera having a narrow field-of-view lens; a second camera having a wide field-of-view lens linked to the first camera, wherein the first camera and the second camera are configured to move along a common axis relative to the rigid surface; and a pre-defined pattern defined on the rigid surface.

In another and alternative embodiment, the first camera comprises at least one first camera extrinsic parameter with respect to the pre-defined pattern.

In another and alternative embodiment, the second camera comprises at least one second camera extrinsic parameter with respect to the pre-defined pattern.

In another and alternative embodiment, each of the first camera extrinsic parameter and the second camera extrinsic parameter is determined responsive to at least one of an upward movement and a downward movement relative to the rigid surface.

In another and alternative embodiment, each of the first camera extrinsic parameter and the second camera extrinsic parameter are configured to obtain a lens zoom factor.

In another and alternative embodiment, the second camera is configured, upon a calibration, for image-to-model registration of a component being viewed.

In another and alternative embodiment, the image-to-model registration of the component being translated to the first camera via a precomputed extrinsic relationship between the first camera and the second camera.

In another and alternative embodiment, each of the first camera extrinsic parameter and the second camera extrinsic parameter comprises a vertical distance between a center of each of the first and second cameras and a plane of the pattern on the rigid surface at two respective locations within the pattern.

In another and alternative embodiment, the pre-defined image comprises a checkerboard pattern.

In another and alternative embodiment, at least one of the first camera and the second camera comprises a microscope camera.

In accordance with the present disclosure, there is provided a method of use for a multi-camera system, comprising viewing a pre-defined pattern mounted on a rigid surface with each of: a first camera having a narrow field-of-view lens and a second camera having a wide field-of-view lens coupled to the first camera; moving simultaneously the first camera and the second camera relative to the rigid surface; and calculating a lens zoom factor between the first camera and the second camera.

In another and alternative embodiment, the method of use for a multi-camera system further comprises calibrating the second camera.

In another and alternative embodiment, the method of use for a multi-camera system further comprises estimating at least one extrinsic parameter of the first camera with respect to the pre-defined pattern; and estimating at least one extrinsic parameter of the second camera with respect to the pre-defined pattern.

In another and alternative embodiment, each of the first camera extrinsic parameter and the second camera extrinsic parameter comprises a vertical distance between a center of each of the first and second cameras and a plane of the pattern on the rigid surface at two respective locations within the pattern.

In another and alternative embodiment, the step of creating a zoom factor between the first camera and the second camera utilizes each of the first camera extrinsic parameter and the second camera extrinsic parameter to obtain the lens zoom factor.

In another and alternative embodiment, the pre-defined image comprises a checkerboard pattern.

In another and alternative embodiment, the method of use for a multi-camera system further comprises creating an image-to-model registration of a component being viewed.

In another and alternative embodiment, the method of use for a multi-camera system further comprises translating the image-to-model registration of the part being viewed to the first camera via a precomputed extrinsic relationship between the first camera and the second camera.

In another and alternative embodiment, at least one of the first camera and the second camera comprises a microscope camera.

Other details of the multi-camera system for simultaneous registration and zoomed imaging are set forth in the following detailed description and the accompanying drawings wherein like reference numerals depict like elements.

DETAILED DESCRIPTION

Figure 1:
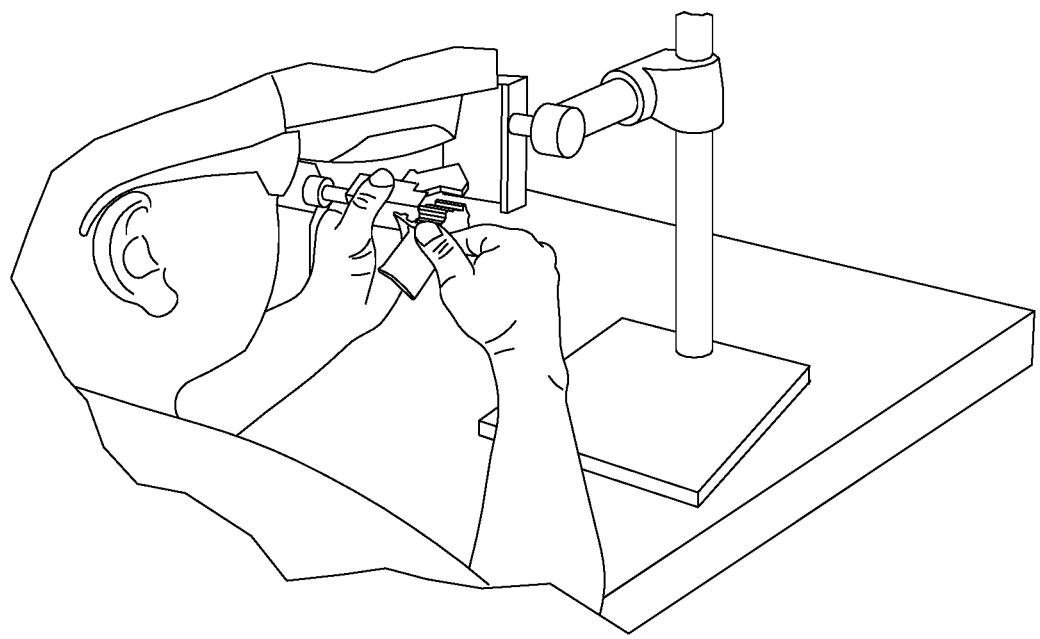
FIG. 1 is a schematic image of a prior art manual inspection utilizing an industrial microscope.
Figure 2:
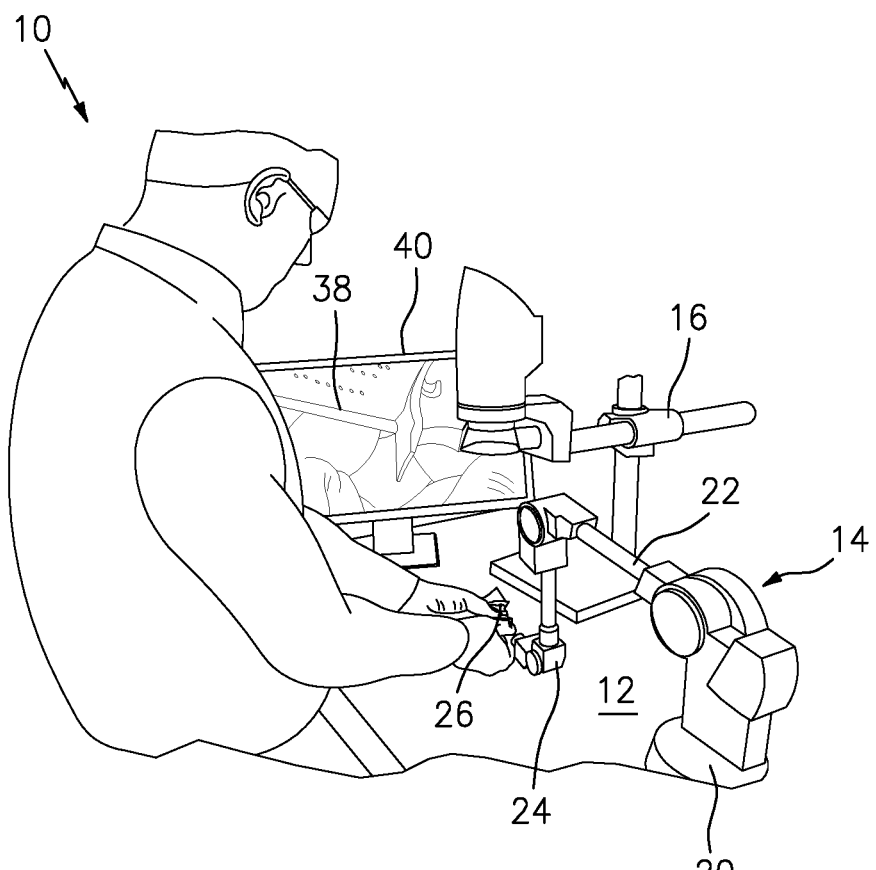
FIG. 2 is an exemplary optical inspection system.

Referring to FIG. 2, an exemplary system for automated component inspection 10 is shown. While automated component inspection 10 is taught herein regarding components, and more particularly gas turbine engine components, the inspection of part or all of natural and manufactured objects is explicitly contemplated. The system 10 includes a rigid surface such as, a precision measuring table 12 configured for precise measurement, such as a precision granite table top. In an alternate embodiment the rigid surface, e.g., precision measuring table 12 is any sufficiently stiff table or mounting surface that the devices affixed thereto do not change relative position or orientation during use more than can be compensated by a registration process (described below). The precision measuring table provides a precise datum for mounting a coordinate measuring machine (CMM) 14 and an imaging device 16 such as a microscope and a monitor 40.

The imaging device 16 may be any measurement device capable of rendering 2D arrays of measurements and is explicitly contemplated as comprising a visible spectrum camera, an infrared camera, and the like.

In exemplary embodiments, the imaging device 16 can be a camera, and include a one-dimensional (1D) or 2D sensor and/or a combination and/or array thereof. Imaging device 16 may be operable in any single frequency or band of frequencies in the electromagnetic spectrum. Imaging device 16 may provide various characteristics of the sensed electromagnetic spectrum including intensity, spectral characteristics, polarization, etc.

In various embodiments, imaging device 16 may include an image capture device, such as an optical device having an optical lens, such as a camera, a microscope camera, mobile video camera, or other imaging device or image sensor, capable of capturing 2D still images or video images.

In various embodiments, imaging device 16 may include a line sensor, a linear image sensor, or other 1D sensor. Further, imaging device 16 may include a 2D sensor, and optical inspection system 10 may extract 1D information from the 2D sensor data or synthesize 2D information from the 1D sensor data. The extracting may be achieved by retaining only a subset of the data such as keeping only that data that is in focus. The synthesizing may be achieved by tiling or mosaicking the data. Even further, imaging device 16 may include a position and/or orientation sensor such as an inertial measurement unit (IMU) that may provide position and/or orientation information about component 26 with respect to a coordinate system or other imaging device 16. The position and/or orientation information may be beneficially employed in aligning 1D or 2D information to a reference model as discussed elsewhere herein.

The coordinate measuring machine 14 includes a base 20 coupled to the table 12. The base 20 supports an arm mechanism or simply arm 22 that can be articulated about 3 different axes to provide six degrees of freedom (6DOF). In an alternative embodiment, the base 20 is coupled to a surface that is itself coupled to, but not coplanar with, table 12. The arm 22 supports a fixture 24 configured to attach a component 26. The coordinate measuring machine 14 is a device for measuring the physical geometrical characteristics of an object. This machine may be manually controlled by an operator or it may be computer controlled. The CMM arm 22 can be calibrated using vendor-supplied techniques.

In an exemplary embodiment, the fixture 24 can be transparent allowing all surfaces of the component 26 to be viewed/imaged by the imaging device 16. In an exemplary embodiment, the fixture 24 is made of an optically transparent material. Such material preferably has high transparency and high toughness. One example material would be Polymethylmethacrylate (PMMA). The material need not be highly rigid providing it does not change the relative position or orientation of component 26 during use more than can be compensated by a registration process (described below). In an alternate embodiment fixture 24 may be made of metallic glass, Gorilla Glass™, sapphire, polycarbonate, and the like. The fixture 24 has known physical dimensions. The fixture 24 can include a shape that conforms to the shape of the component 26. In an exemplary embodiment, if the component 26 is a blade, the fixture 24 can have a convoluted shape that conforms to the fir tree of the root of the blade, such that the root of the blade is supported by the fixture 24. The component 26 can then be precisely located relative to fixture 24 which, in turn, is precisely located relative to the CMM 14 and, hence, to the table 12.

The component 26, such as a turbine engine blade, is coupled to the fixture 24 of the arm 22 of the CMM 14, at a location typically occupied by a probe (not shown). Measurements of the component 26 are defined by the component attached to the arm of the CMM 14. In one non-limiting embodiment, the CMM 14 provides data that reports the component 26 location and pose in all 6 degrees of freedom (6 DOF). In another non-limiting embodiment, CMM 14 provides data comprising one or more of three location measurements and 3 rotation measurements.

Figure 3:
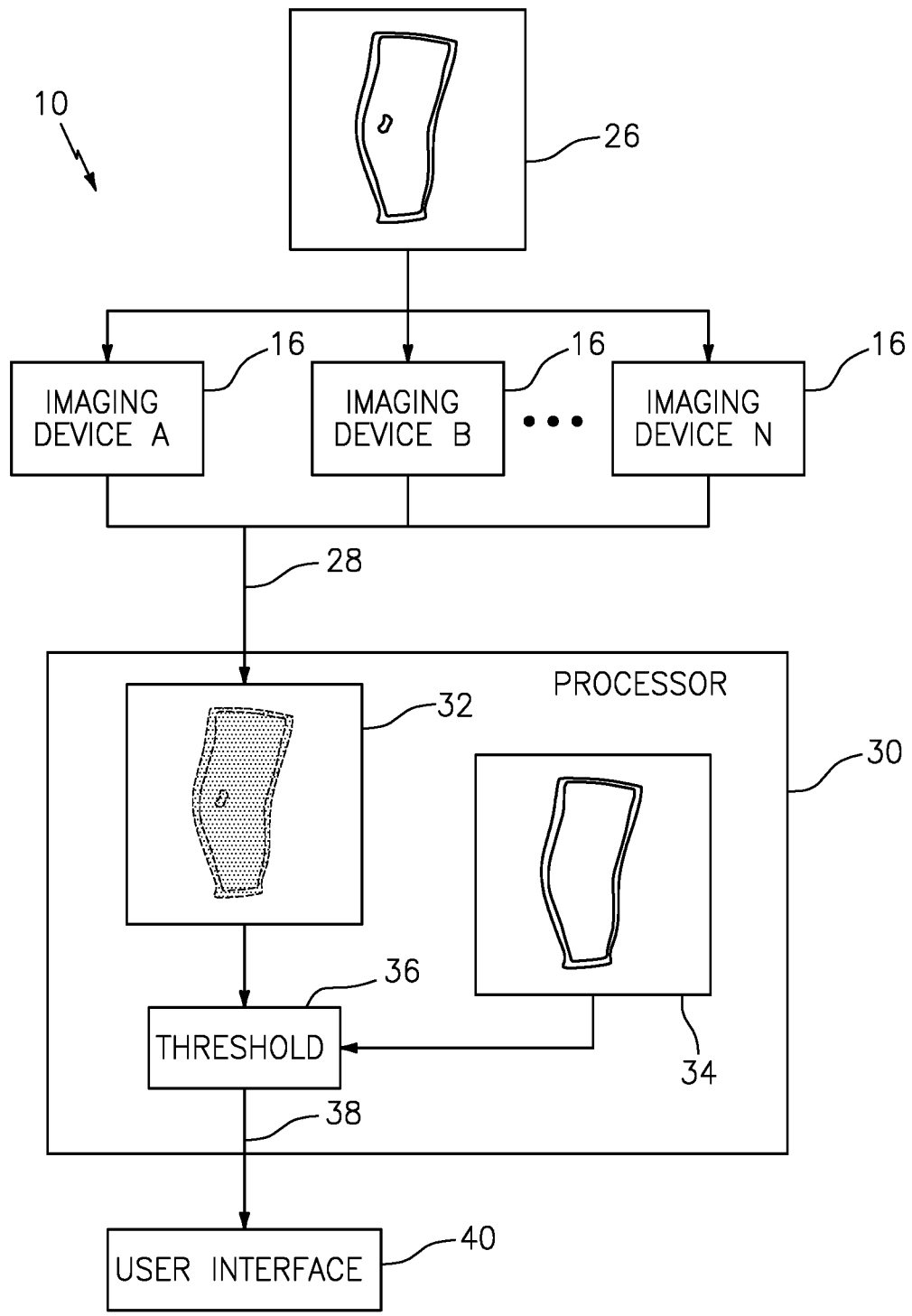
FIG. 3 is a schematic diagram of an exemplary optical inspection system in accordance with various embodiments.

Referring also to FIG. 3, data 28 from imaging device(s) 16 may be transmitted to one or more processors 30 (e.g., computer systems having a central processing unit and memory) for recording, processing and storing the data received from imaging device 16. Processor 30 may include a general-purpose processor, a digital signal processor (DSP), an application specific integrated circuit (ASIC), a field programmable gate array (FPGA) or other programmable logic device, discrete gate or transistor logic, discrete hardware components, or any combination thereof. Processor 30 may be in communication (such as electrical communication) with imaging device 16 and may be configured to receive input, such as images from imaging device 16. Processor 30 may receive data 28 about component 26 captured and transmitted by the imaging device 16 via a communication channel. Upon receiving the data 28, the processor 30 may process data 28 from imaging device 16 to determine if damage or defects are present on the component 20.

In various embodiments, processor 30 may receive or construct image information 32 corresponding to the component 26. Processor 30 may further include a reference model 34 stored, for example, in memory of processor 30. Reference model 34 may be generated from a CAD model, a 3D CAD model, and/or 3D information, such as from a 3D scan or 3D information of an original component or an undamaged component, and the like. In various alternative embodiments, reference model 22 may comprise 1D or 2D information from a projection of a 2D or 3D model, prior 1D or 2D information from sensors 16, and the like. Reference model 34 may be a theoretical model, may be based on historical information about component 26, may be based on current information about component 26, and the like. Reference model 34 may be adjusted and updated as component 26 and/or similar components are scanned and inspected. Thus, reference model 34 may be a learned model of a component and may include, for example, 3D information including shape and surface features of the component.

In various embodiments, processor 30 of optical inspection system 10 may classify the damage and determine the probability of damage and/or if the damage meets or exceeds a threshold 36. Threshold 36 may be an input parameter based on reference model 34, based on user input, based on data from sensor(s) 16, and the like. Processor 30 may provide an output 38 to a user interface 40 indicating the status of the component 26. User interface 40 may include a display. Optical inspection system 10 may display an indication of the defect to component 26, which may include an image and/or a report. In addition to reporting any defects in the component, output 38 may also relay information about the type of defect, the location of the defect, size of the defect, and the like. If defects are found in the inspected component 26, an indicator may be displayed on user interface 40 to alert personnel or users of the defect.

Figure 4:
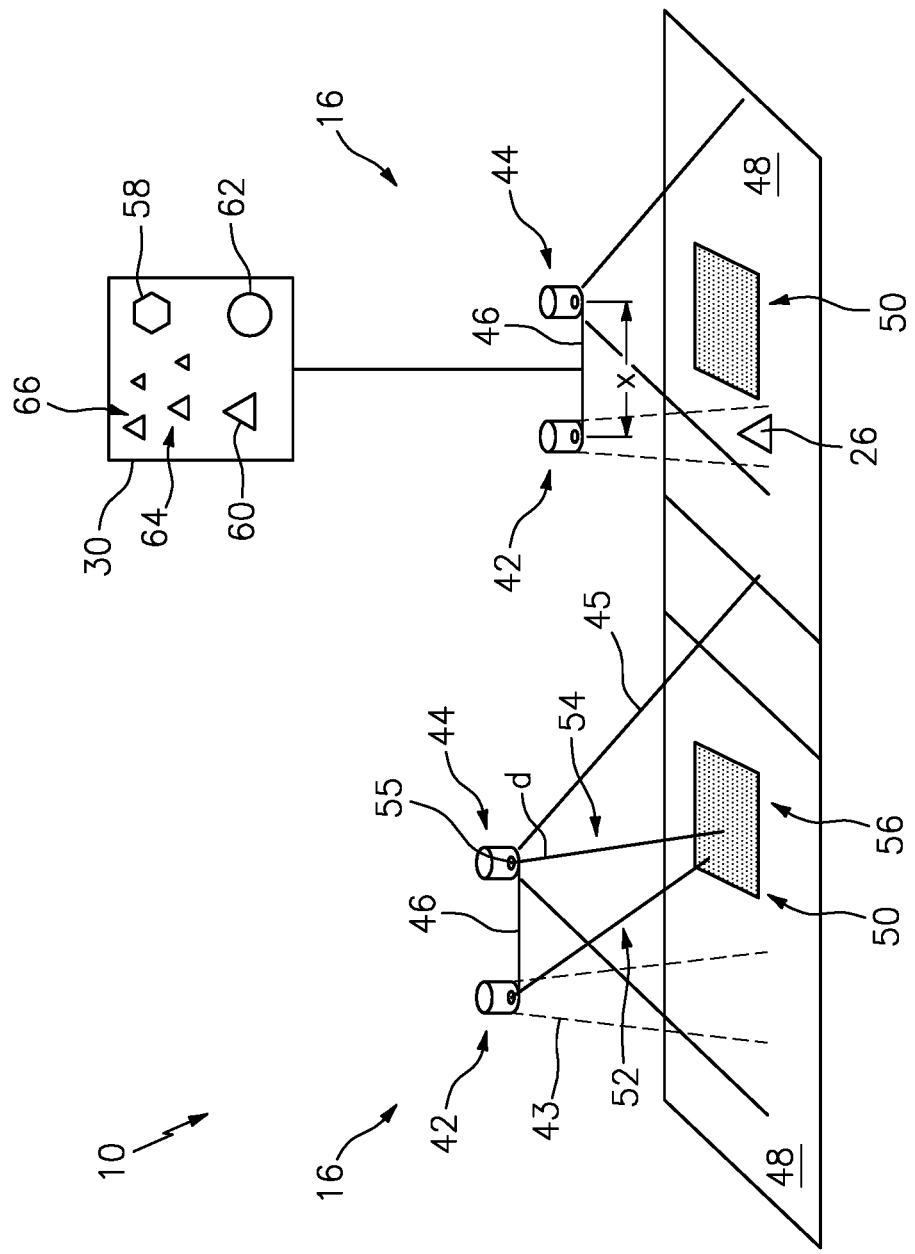
FIG. 4 is an exemplary optical inspection system for components using simultaneous multiple camera images in accordance with various embodiments.

With reference to FIG. 4, the exemplary optical inspection system 10 for components using simultaneous multiple camera images is shown. The system 10 is shown with two imaging devices or simply camera 16. A first camera 42 can comprise a camera with a narrow field-of-view lens 43. A second camera 44 can be a camera with a wide field-of-view lens 45. The first camera 42 is linked to the second camera 44 such that the first camera 42 and second camera 44 are configured to move identical distances along a common axis 46 relative to a table top 48 of the table 12. In one non-limiting embodiment, common axis 46 is orthogonal to table 12.

A pre-defined pattern 50 can be defined on the table top 48. The pre-defined pattern 50 can be a checkerboard image or other dimensioned image. In an exemplary embodiment, the pre-defined pattern 50 can include a fiducial marker. A fiducial marker can be an object placed in the field of view of an imaging system which appears in the image produced, for use as a point of reference or a measure. Fiducial markers can be either something placed into or on the imaging subject, or a mark or set of marks in the reticle of an optical instrument.

The first camera 42 can include at least one first camera extrinsic parameter 52 with respect to the pre-defined pattern 50. The second camera 44 can include at least one second camera extrinsic parameter 54 with respect to the pre-defined pattern 50. Each of the first camera 42 and second camera 44 each can have intrinsic parameters that are internal to and fixed to a particular camera/imaging device setup. The first and second camera extrinsic parameters 52, 54 are camera parameters that are external to each camera and change with respect to the coordinates of the cameras 42, 44 with respect to the table top 48. The extrinsic parameters 52, 54 are utilized to define a location and orientation of the cameras 42, 44 with respect to the table top 48. The first camera extrinsic parameter 52 and the second camera extrinsic parameter 54 can be determined responsive to one or more of an upward movement and a downward movement of the cameras 42, 44 relative to the table top 48. In an exemplary embodiment each of the first camera extrinsic parameter 52 and the second camera extrinsic parameter 54 comprises a vertical distance d between a center 55 of each of the first and second cameras 42, 44 and a plane 56 of the pattern 50 on the table top 48 at two respective locations within the pattern 50.

Each of the first camera extrinsic parameter 52 and the second camera extrinsic parameter 54 are configured to obtain a lens zoom factor 58. The lens zoom factor 58 can be understood as a factor by which an image is given more detail (magnified) or given less detail (shrunk or de-magnified) in its display from a normal presentation in an original configuration. The second camera 44 can be configured, upon a calibration, for an image-to-model registration 60 of a part/component 26 being viewed. The image-to-model registration 60 of the part/component 26 is translated to the first camera via a precomputed extrinsic relationship 62 between the first camera 42 and the second camera 44. In an exemplary embodiment, the accurate lens zoom factor 58 for the narrow field of view camera 42 can be obtained by coupling the second camera 44 having a wider field of view lens 45 to move simultaneously with the narrow field of view camera 42. The simultaneous multiple camera images can also be utilized to create accurate 2D-3D registration.

In an exemplary embodiment, a first set of images 64 are recorded from each camera 42, 44. The cameras 42, 44 are physically moved an identical distance X along their common axis 46 closer or further from the pattern 50 or fiducial marks, then a second set of images 66 are recorded. The ratio of change of size between the first set of images 64 and the second set of images 66 in the second camera 44 to the change of size between the first set of images 64 and the second set of images 66 in the first camera 42 is the zoom factor 58 ((depicted schematically as a hexagon which may be considered as having a zoomed size relative to a predefined standard size).

The location and image size of a known pattern 50 or fiducial marks may be found in an image by template matching techniques including a random consensus (RANSAC) of features where the features include scale-invariant feature transform (SIFT), Speed-Up Robust Feature (SURF) algorithm, Affine Scale Invariant Feature Transform (ASIFT), other SIFT variants, a Harris Corner Detector, a Smallest Univalue Segment Assimilating Nucleus (SUSAN) algorithm, a Features from Accelerated Segment Test (FAST) corner detector, a Phase Correlation, a Normalized Cross-Correlation, a Gradient Location Orientation Histogram (GLOH) algorithm, a Binary Robust Independent Elementary Features (BRIEF) algorithm, a Center Surround Extremas (CenSure/STAR) algorithm, and an Oriented and Rotated BRIEF (ORB) algorithm.

In another exemplary embodiment, a simple ratio between sizes is not sufficient to calculate the zoom factor 58 accurately due to inherent lens distortions in one or both cameras 42, 44. In this case, one or both of the intrinsic and extrinsic parameters of one or both cameras 42, 44 are computed. The calibration of intrinsic and/or extrinsic parameters may be performed as needed. The extrinsic parameters 52, 54 of one or both cameras 42, 44 are first computed, the cameras 42, 44 are physically moved an identical distance along their common axis 46 closer or further from the pattern or fiducial marks 50, and the extrinsic parameters 52, 54 are recomputed. The zoom factor 58 may be computed from the first and recomputed extrinsic parameters 52, 54. In one nonlimiting embodiment, the cameras 42, 44 are moved a known, but non-identical, distance along their common axis. In this case, the images from either camera may be scaled by the ratio or inverse ratio of distances such that the images are substantially as if the cameras had been moved an identical distance. In yet another non-limiting embodiment, common axis 46 need not be orthogonal to table 12, but the angle to the orthogonal direction is known. In this case, the images from either camera may be scaled by the trigonometric relationship of the angle to the orthogonal and the distances moved such that the images are substantially as if the cameras had been moved an identical distance in an orthogonal direction.

Figure 5:
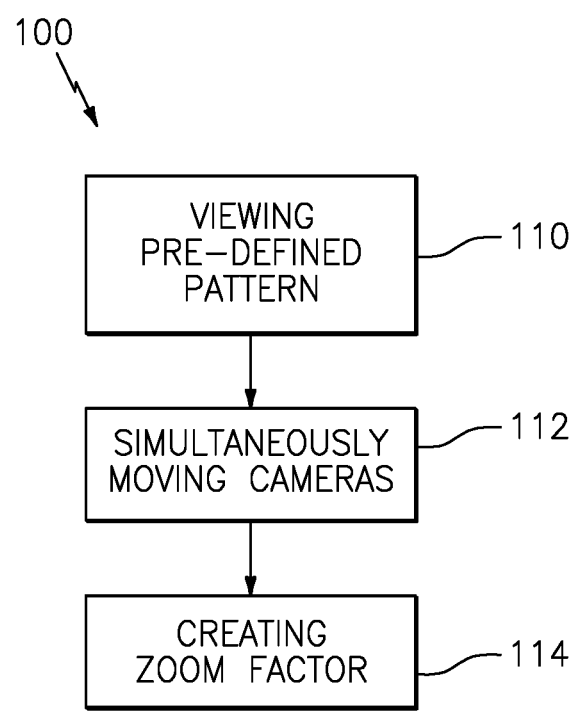
FIG. 5 is a process map of the exemplary optical inspection system for components using simultaneous multiple camera images in accordance with various embodiments.

Referring also to FIG. 5 a process map of an exemplary method of use of the optical inspection system for components using simultaneous multiple camera images in accordance with various embodiments is shown. The process 100 includes a step 110 of viewing the pre-defined pattern 50 mounted on the table top 48 with each of the first camera 42 having a narrow field-of-view lens 43 and the second camera 44 having a wide field-of-view lens 45 coupled to the first camera 42. The next step 112 includes moving simultaneously the first camera 42 and the second camera 44 relative to the table top 48 taking images from both cameras at both positions. The next step 114 includes computing a lens zoom factor 58 between the first camera 42 and the second camera 44 based on the images. The method further comprises calibrating the second camera 44. The method can also include estimating at least one extrinsic parameter 52 of the first camera 42 with respect to the pre-defined pattern 48; and estimating at least one extrinsic parameter 54 of the second camera 44 with respect to the pre-defined pattern 48. Other details of the exemplary method can be seen from discussion above.

There has been provided a multi-camera system for simultaneous registration and zoomed imaging. While the multi-camera system for simultaneous registration and zoomed imaging has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A multi-camera system for component inspection comprising:
    a rigid surface;
    a first camera having a narrow field-of-view lens;
    a second camera having an overlapping view wide field-of-view lens linked to said first camera, wherein said first camera and said second camera are configured to move identical distances along a common axis relative to said rigid surface, wherein said second camera wide field-of-view lens includes a field-of-view that is wider than said first camera lens narrow field-of-view; wherein said second camera is configured, upon a calibration, for image-to-model registration of a part being viewed; wherein said image-to-model registration of the component being translated to said first camera via a precomputed extrinsic relationship between said first camera and said second camera; and
    a pre-defined pattern defined on said rigid surface.

2. The multi-camera system for component inspection of claim 1, wherein said first camera comprises at least one first camera extrinsic parameter with respect to said pre-defined pattern.

3. The multi-camera system for component inspection of claim 2, wherein said second camera comprises at least one second camera extrinsic parameter with respect to said pre-defined pattern.

4. The multi-camera system for component inspection of claim 3, wherein each of said first camera extrinsic parameter and said second camera extrinsic parameter is determined responsive to at least one of an upward movement and a downward movement relative to said rigid surface.

5. The multi-camera system for component inspection of claim 4, wherein each of said first camera extrinsic parameter and said second camera extrinsic parameter are configured to obtain a lens zoom factor.

6. The multi-camera system for component inspection of claim 5, wherein each of said first camera extrinsic parameter and said second camera extrinsic parameter comprises a vertical distance between a center of each of said first and second cameras and a plane of the pattern on the rigid surface at two respective locations within the pattern.

7. The multi-camera system for component inspection of claim 1, wherein said pre-defined image comprises a checkerboard pattern.

8. The multi-camera system for component inspection of claim 1, wherein at least one of said first camera and said second camera comprises a microscope camera.

9. A method of use for a multi-camera system, comprising:
    overlapping viewing a pre-defined pattern mounted on a rigid surface with each of:
    a first camera having a narrow field-of-view lens and a second camera having a wide field-of-view lens coupled to said first camera; wherein said second camera wide field-of-view lens includes a field-of-view that is wider than said first camera lens narrow field-of-view;
    moving identical distances along a common axis simultaneously said first camera and said second camera relative to said rigid surface;
    creating an image-to-model registration of a component being viewed;
    translating said image-to-model registration of said component being viewed to said first camera via a precomputed extrinsic relationship between said first camera and said second camera; and
    calculating a lens zoom factor between said first camera and said second camera.

10. The method of use for a multi-camera system of claim 9, further comprising:
    calibrating said second camera.

11. The method of use for a multi-camera system of claim 10, further comprising:
    estimating at least one extrinsic parameter of said first camera with respect to said pre-defined pattern; and
    estimating at least one extrinsic parameter of said second camera with respect to said pre-defined pattern.

12. The method of use for a multi-camera system of claim 11, wherein each of said first camera extrinsic parameter and said second camera extrinsic parameter comprises a vertical distance between a center of each of said first and second cameras and a plane of the pattern on the rigid surface at two respective locations within the pattern.

13. The method of use for a multi-camera system of claim 10, wherein said step of calculating a zoom factor between said first camera and said second camera utilizes each of said first camera extrinsic parameter and said second camera extrinsic parameter to obtain said lens zoom factor.

14. The method of use for a multi-camera system of claim 9, wherein said pre-defined image comprises a checkerboard pattern.

15. The method of use for a multi-camera system of claim 9, wherein at least one of said first camera and said second camera comprises a microscope camera.

\* \* \* \* \*